(12) United States Patent
Yoshimura et al.

(10) Patent No.: US 8,896,862 B2
(45) Date of Patent: Nov. 25, 2014

(54) IMAGE PROCESSING APPARATUS, CONTROL METHOD, AND STORAGE MEDIUM FOR PRINT CONTROL USING METADATA

(75) Inventors: Yasuhiro Yoshimura, Tokyo (JP); Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/011,701

(22) Filed: Jan. 21, 2011

(65) Prior Publication Data

US 2011/0181913 A1 Jul. 28, 2011

(30) Foreign Application Priority Data

Jan. 25, 2010 (JP) ................................. 2010-013241

(51) Int. Cl.
*G06F 3/12* (2006.01)
(52) U.S. Cl.
CPC ............ *G06F 3/1205* (2013.01); *G06F 3/1244* (2013.01); *G06F 3/1243* (2013.01)
USPC .......... 358/1.15; 358/1.13; 358/1.9; 358/1.18
(58) Field of Classification Search
CPC .... G06F 3/1246; G06F 3/1248; G06F 17/301
USPC .................. 358/1.15, 1.18; 382/190, 192, 198
See application file for complete search history.

(56) References Cited

U.S. PATENT DOCUMENTS

| | | | |
|---|---|---|---|
| 6,526,215 B2 * | 2/2003 | Hirai et al. ..................... 386/282 |
| 7,375,842 B2 * | 5/2008 | Kloosterman et al. ....... 358/1.18 |
| 7,545,521 B2 | 6/2009 | Hanamoto | |
| 7,992,145 B2 * | 8/2011 | Emerson et al. .............. 718/100 |
| 8,294,942 B2 * | 10/2012 | Myoki ......................... 358/1.18 |
| 8,452,751 B2 * | 5/2013 | Arrouye et al. ............... 707/707 |
| 8,553,263 B2 * | 10/2013 | Mori ............................. 358/1.15 |
| 8,559,047 B2 * | 10/2013 | Naka et al. .................... 358/1.16 |
| 2002/0167683 A1 * | 11/2002 | Hanamoto et al. ............ 358/1.14 |
| 2004/0184067 A1 * | 9/2004 | Suzuki .......................... 358/1.15 |
| 2005/0019739 A1 * | 1/2005 | Cunningham et al. ........ 434/350 |
| 2005/0154761 A1 * | 7/2005 | Lee et al. ..................... 707/104.1 |
| 2005/0198042 A1 * | 9/2005 | Davis .............................. 707/10 |
| 2005/0243368 A1 * | 11/2005 | Sedky et al. ................. 358/1.16 |

(Continued)

FOREIGN PATENT DOCUMENTS

EP 1837752 A2 9/2007
JP 2003-100861 A 4/1991

(Continued)

OTHER PUBLICATIONS

"Introduction to Access"; Nikkei Personal Computing;vol. 397, p. 203-206, Nov. 12, 2013.

*Primary Examiner* — Dennis Dicker
(74) *Attorney, Agent, or Firm* — Canon USA Inc. IP Division

(57) ABSTRACT

An information processing apparatus includes a specification unit configured to specify a layer of a record level from print data of a hierarchical structure having metadata, a display control unit configured to display the metadata contained in the layer specified by the specification unit, a receiving unit configured to receive selection of specific metadata for filter printing from the metadata displayed by the display control unit, and a determination unit configured to determine a record in which the specific metadata received by the receiving unit is set to be a print target.

9 Claims, 26 Drawing Sheets

(56) References Cited

U.S. PATENT DOCUMENTS

| | | |
|---|---|---|
| 2005/0289107 A1 | 12/2005 | Arrouye |
| 2005/0289109 A1* | 12/2005 | Arrouye et al. .................. 707/1 |
| 2006/0023238 A1* | 2/2006 | Blaszyk et al. ............. 358/1.13 |
| 2006/0036934 A1* | 2/2006 | Fujiwara ...................... 715/500 |
| 2006/0167861 A1* | 7/2006 | Arrouye et al. .................. 707/3 |
| 2008/0263036 A1* | 10/2008 | Yamamoto ........................ 707/6 |
| 2009/0099853 A1* | 4/2009 | Lemelson ......................... 705/1 |
| 2011/0052074 A1* | 3/2011 | Hayaishi ....................... 382/190 |
| 2011/0170135 A1* | 7/2011 | Ito ................................ 358/1.15 |
| 2011/0170140 A1* | 7/2011 | Naka et al. .................. 358/1.16 |

FOREIGN PATENT DOCUMENTS

| | | |
|---|---|---|
| JP | 2007-56784 A | 3/1995 |
| JP | 2003-037731 A | 2/2003 |
| JP | 2003-323289 A | 11/2003 |

* cited by examiner

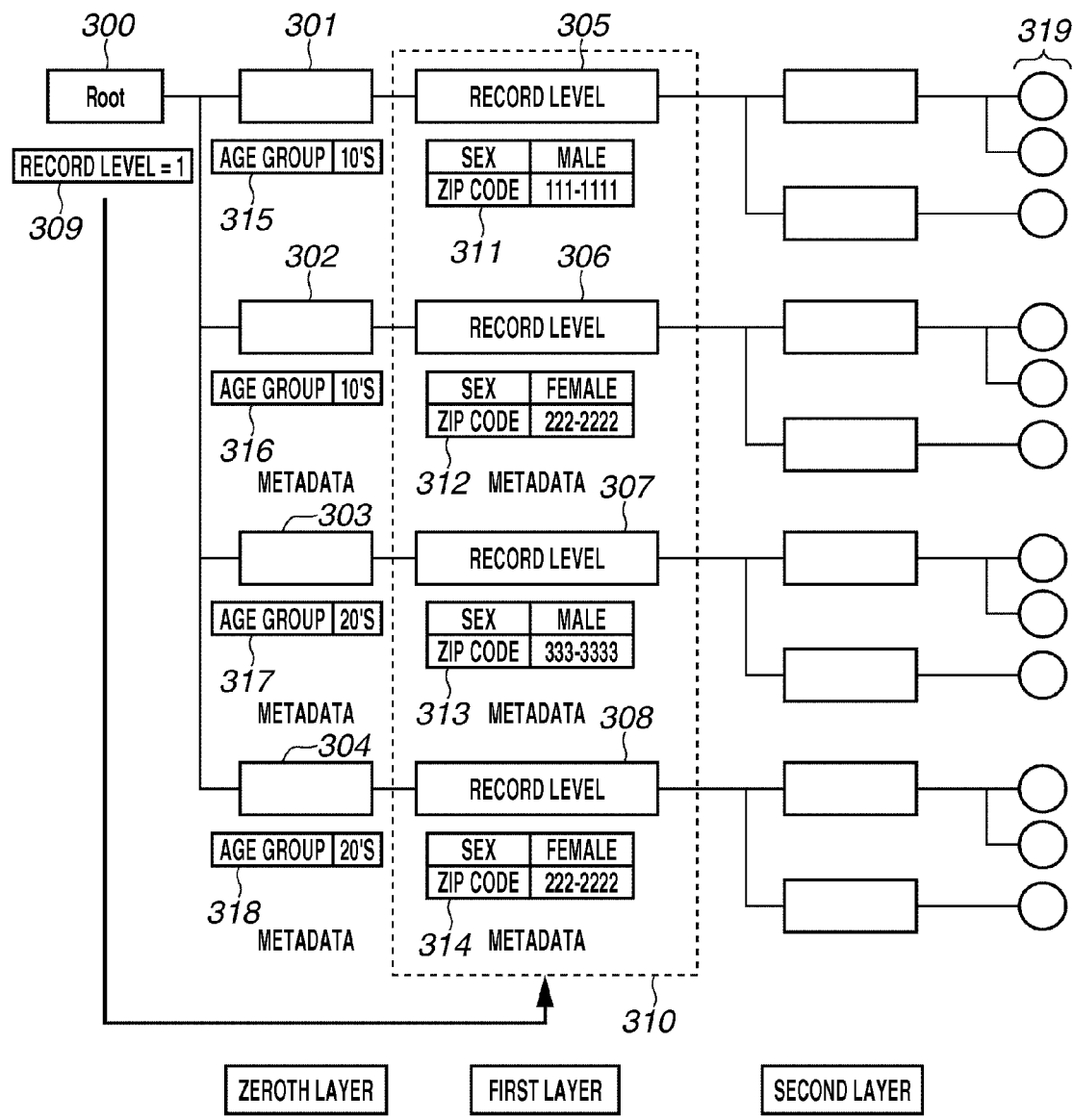

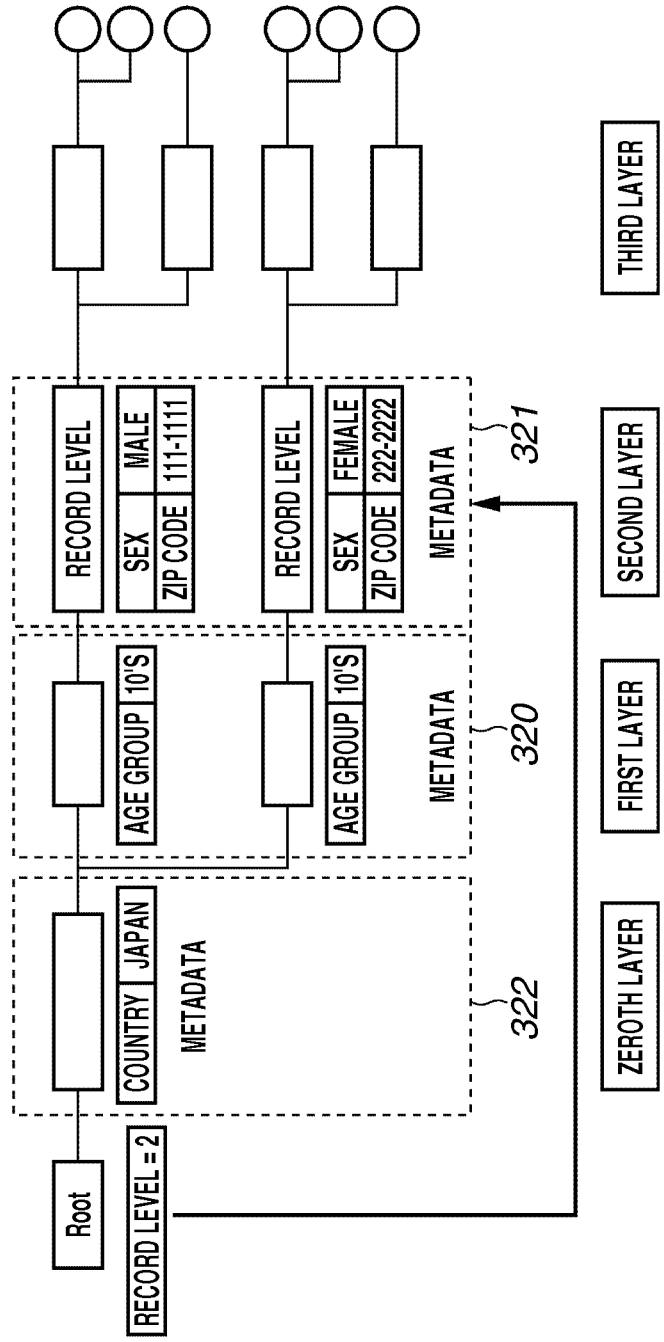

FIG.4A

| RECORD 400 | SEX 401 | ZIP CODE 402 |
|---|---|---|
| 0001 | MALE | 111-1111 |
| 0002 | FEMALE | 222-2222 |
| 0003 | MALE | 333-3333 |
| 0004 | FEMALE | 222-2222 |

FIG.4B

| PRINT TARGET RECORD | |
|---|---|
| 403 | 0001 |
| 404 | 0003 |

FIG.5B

| FILTERING | FINISHING | PAGE SETUP | PAPER FEEDING |

*513*  *514*

SEX ☐ SPECIFY SEX OTHER THAN SELECTED ONE

ZIP CODE ☑ SPECIFY ZIP CODE OTHER THAN SELECTED ONE

```
MALE
FEMALE
```

```
111-1111
222-2222
333-3333
```

NUMBER OF RECORDS TO BE PRINTED = 1

PRINT

FIG.6

| RECORD | SEX | ZIP CODE |
|---|---|---|
| 0001 | MALE | 111-1111 |
| 0002 | FEMALE | 111-1111 |
| 0003 | MALE | 111-1111 |
| 0004 | FEMALE | 111-1111 |

601

| FILTERING | FINISHING | PAGE SETUP | PAPER FEEDING |

SEX

MALE
FEMALE

NUMBER OF RECORDS TO BE PRINTED = 2

PRINT

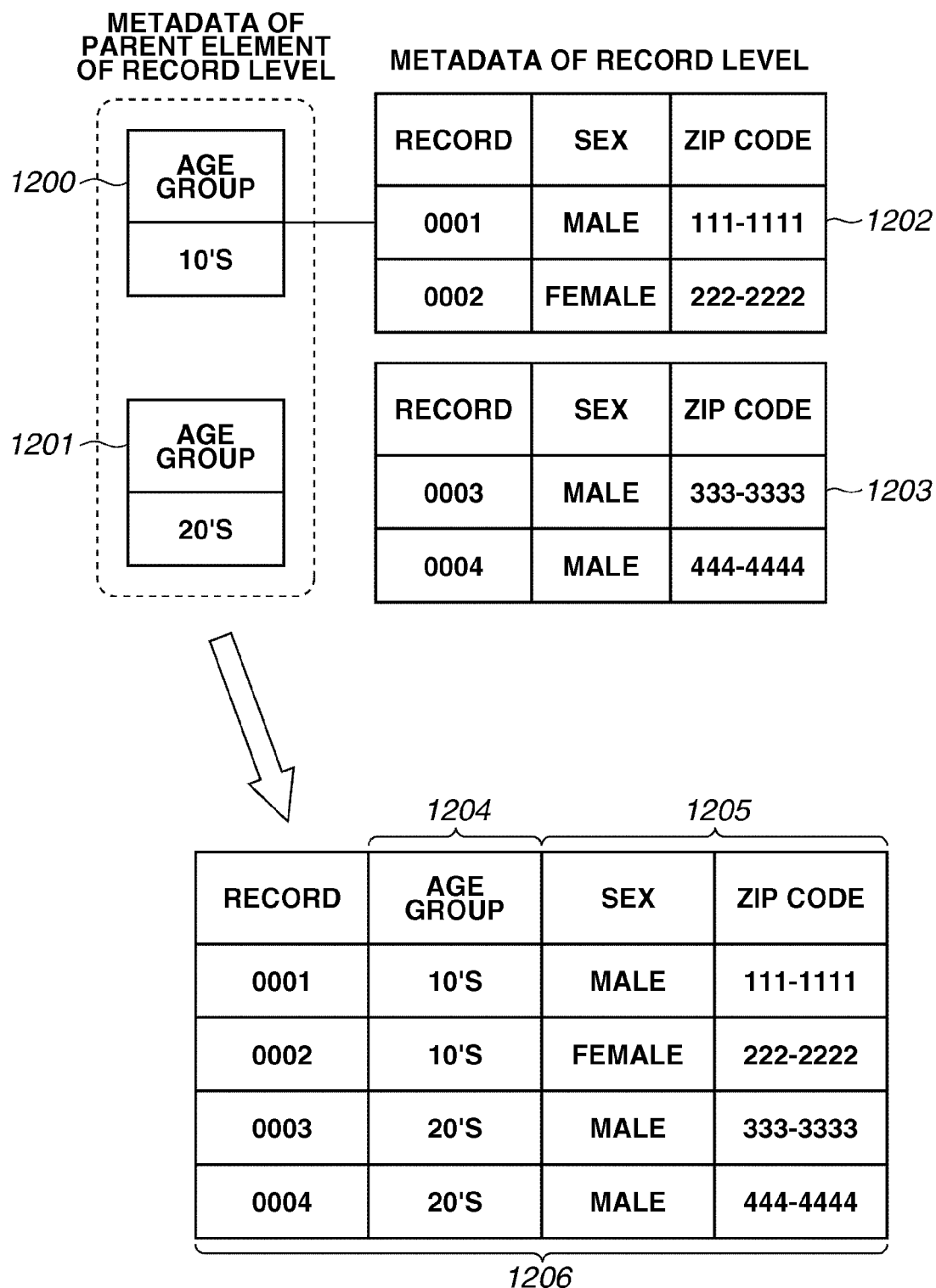

FIG.10A

FILTERING | PAGE SETUP

SEX
- MALE
- FEMALE

ZIP CODE
- 111-1111
- 222-2222
- 333-3333

1300 — ☐ DISPLAY METADATA OF PARENT ELEMENT TOGETHER

NUMBER OF RECORDS TO BE PRINTED = 2

[PRINT]

FIG.10B

FILTERING | PAGE SETUP

AGE GROUP
- 10'S
- 20'S

SEX
- MALE
- FEMALE

ZIP CODE
- 111-1111
- 222-2222
- 333-3333

— 1306

1303 — ☑ DISPLAY METADATA OF PARENT ELEMENT TOGETHER

NUMBER OF RECORDS TO BE PRINTED = 2

[PRINT]

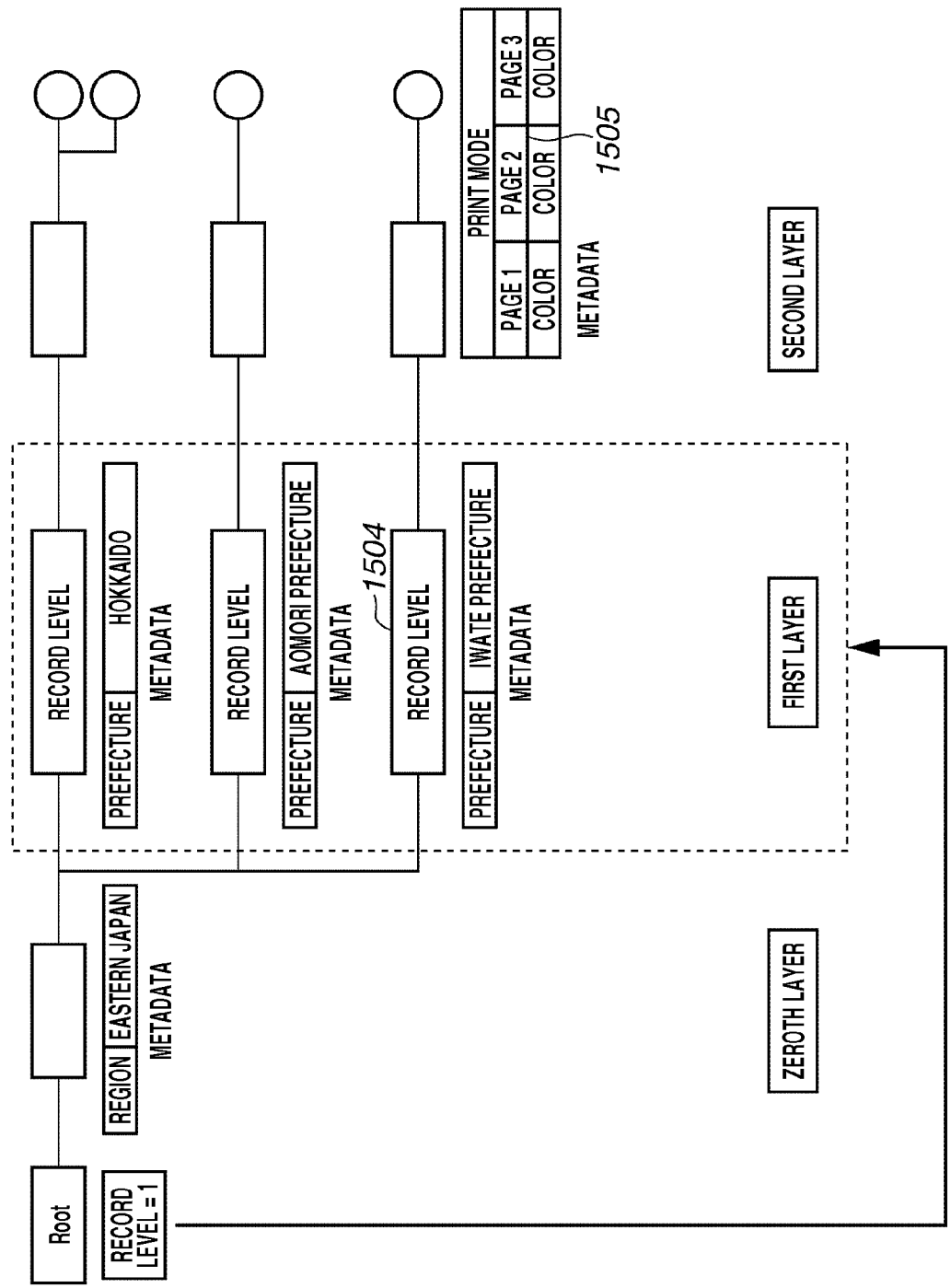

FIG.13A

| RECORD | PREFECTURE | PRINT MODE | | |
|---|---|---|---|---|
| | | PAGE 1 | PAGE 2 | PAGE 3 |
| 0001 | HOKKAIDO | COLOR | COLOR | COLOR _~1600_ |
| 0002 | AOMORI PREFECTURE | MONOCHROME | MONOCHROME | MONOCHROME _~1601_ |
| 0003 | IWATE PREFECTURE | COLOR | COLOR | COLOR _~1602_ |

FIG.13B

| RECORD | PREFECTURE | PRINT MODE | | |
|---|---|---|---|---|
| | | PAGE 1 | PAGE 2 | PAGE 3 |
| 0001 | HOKKAIDO | COLOR | COLOR | COLOR |
| 0002 | AOMORI PREFECTURE | MONOCHROME | COLOR | MONOCHROME _~1604_ |
| 0003 | IWATE PREFECTURE | COLOR | COLOR | COLOR |

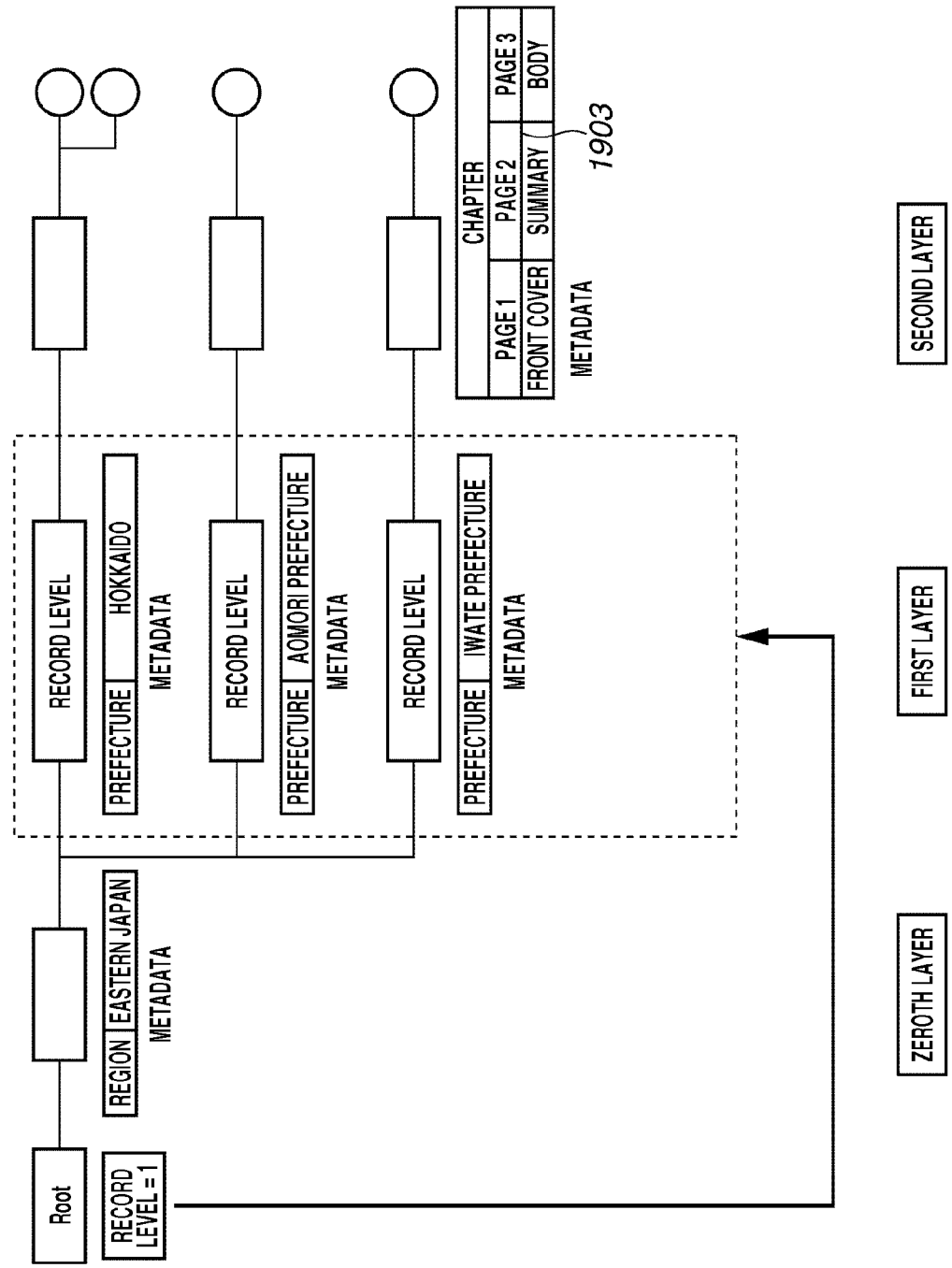

| RECORD | PREFECTURE |
|---|---|
| 0001 | HOKKAIDO |
| 0002 | AOMORI PREFECTURE |
| 0003 | IWATE PREFECTURE |

| PAGE 1 | PAGE 2 | PAGE 3 |
|---|---|---|
| FRONT COVER | SUMMARY | BODY |
| FRONT COVER | SUMMARY | BODY |
| FRONT COVER | SUMMARY | BODY |

| RECORD | PREFECTURE | CHAPTER | | |
|---|---|---|---|---|
| | | PAGE 1 | PAGE 2 | PAGE 3 |
| 0001 | HOKKAIDO | FRONT COVER | SUMMARY | BODY |
| 0002 | AOMORI PREFECTURE | FRONT COVER | SUMMARY | BODY |
| 0003 | IWATE PREFECTURE | FRONT COVER | SUMMARY | BODY |

FIG.20A

| RECORD | REGION | PREFECTURE | PRINT MODE | | |
|---|---|---|---|---|---|
| | | | PAGE 1 | PAGE 2 | PAGE 3 |
| 0001 | EASTERN JAPAN | HOKKAIDO | COLOR | COLOR | COLOR |
| 0002 | EASTERN JAPAN | HOKKAIDO | MONOCHROME | MONOCHROME | MONOCHROME |
| 0003 | WESTERN JAPAN | OKINAWA PREFECTURE | COLOR | COLOR | COLOR |
| 0004 | WESTERN JAPAN | OKINAWA PREFECTURE | COLOR | COLOR | COLOR |

METADATA OF PARENT LAYER OF RECORD LEVEL

METADATA OF RECORD LEVEL

METADATA OF CHILD LAYER OF RECORD LEVEL

FIG.20B

| RECORD | REGION | PREFECTURE | PRINT MODE | | |
|---|---|---|---|---|---|
| | | | PAGE 1 | PAGE 2 | PAGE 3 |
| 0001 | EASTERN JAPAN | HOKKAIDO | COLOR | COLOR | COLOR |
| 0002 | EASTERN JAPAN | HOKKAIDO | MONOCHROME | COLOR | MONOCHROME |
| 0003 | WESTERN JAPAN | OKINAWA PREFECTURE | COLOR | COLOR | COLOR |
| 0004 | WESTERN JAPAN | OKINAWA PREFECTURE | COLOR | COLOR | COLOR |

METADATA OF PARENT LAYER OF RECORD LEVEL

METADATA OF RECORD LEVEL

METADATA OF CHILD LAYER OF RECORD LEVEL

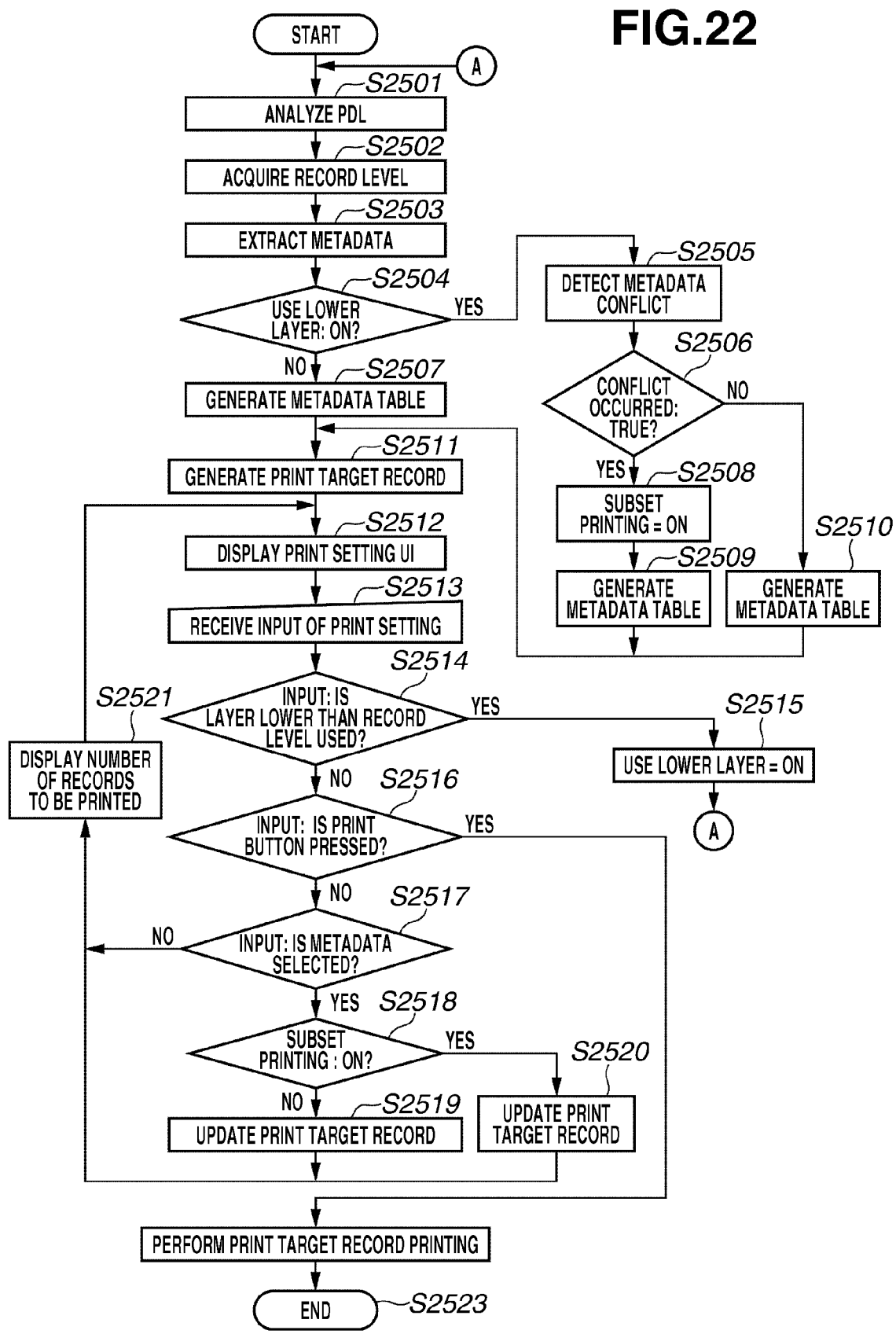

IMAGE PROCESSING APPARATUS, CONTROL METHOD, AND STORAGE MEDIUM FOR PRINT CONTROL USING METADATA

BACKGROUND OF THE INVENTION

1. Field of the Invention

The present invention relates to a print system for performing print control using metadata expressed in a hierarchical structure stored in a page description language (PDL).

2. Description of the Related Art

Variable printing for customizing a print document PDL for each customer and performing printing has attracted attention. As a specification for the variable printing, standardization of Portable Document Format/Variable data and Transactional (PDF/VT) has been started.

In the PDF/VT, which is PDL data, a hierarchical structure called Document Part (DPart) is added and a page of PDF is structured. Further, in the PDF/VT, metadata called Document Part Metadata (DPM) can be added to each DPart. The metadata is expressed in a hierarchical structure expressed in a tree structure.

Japanese Patent Application Laid-Open No. 2003-037731 discusses an image processing apparatus and a method for determining a front cover to be used for printing using metadata when the printing is performed using data containing binary data and metadata. However, in the technique discussed in Japanese Patent Application Laid-Open No. 2003-037731, it is not possible to selectively print a record specified by a user using metadata contained in a PDL.

Meanwhile, conventionally, a technique for generating a job ticket (compliant with Job Definition Format (JDF)) and selecting a record in order to select the record using metadata contained in a PDL is known.

However, in the technique, processing operations for generating the job ticket in which the metadata is written and for interpreting the job ticket are generated. Accordingly, it is not possible to easily select the record using the metadata contained in the PDL.

SUMMARY OF THE INVENTION

According to an aspect of the present invention, an information processing apparatus includes a specification unit configured to specify a layer of a record level from print data of a hierarchical structure having metadata, a display control unit configured to display the metadata contained in the layer specified by the specification unit, a receiving unit configured to receive selection of specific metadata for filter printing from the metadata displayed by the display control unit, and a determination unit configured to determine a record in which the specific metadata received by the receiving unit is set to be a print target.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are PDL structure diagrams in FIG. 2.

FIGS. 4A and 4B illustrate a metadata table and a print target record, respectively, in FIGS. 3A and 3B.

FIGS. 5A and 5B illustrate print setting user interfaces (UIs) for specifying metadata in FIGS. 4A and 4B.

FIG. 6 illustrates a print setting UI in a case where the metadata of the all records in FIGS. 4A and 4B is common.

FIG. 9 illustrates metadata of a record level and metadata of a parent element of the record level according to the second exemplary embodiment.

FIGS. 10A and 10B illustrate print setting UIs according to a third exemplary embodiment of the present invention.

FIG. 12 illustrates a PDL structure diagram according to the third exemplary embodiment.

FIGS. 13A and 13B illustrate metadata tables according to the third exemplary embodiment.

FIG. 16 illustrates a PDL structure diagram according to the fourth exemplary embodiment.

FIGS. 20A and 20B illustrate metadata tables according to the fifth exemplary embodiment.

FIG. 22 illustrates a flowchart according to the fifth exemplary embodiment.

DESCRIPTION OF THE EMBODIMENTS

Various exemplary embodiments, features, and aspects of the invention will be described in detail below with reference to the drawings.

Hereinafter, the exemplary embodiments of the present invention will be described with reference to the attached drawings. The present invention can be applied to both of printer controllers and printer drivers. In the exemplary embodiments described below, a system for performing printing using a printer driver to which the present invention is applied is described.

Figure 1A:
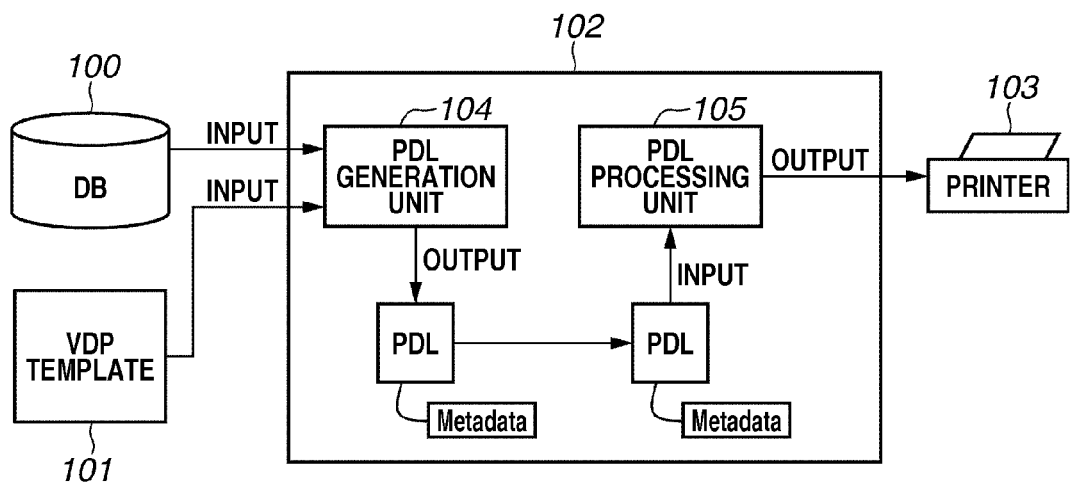
FIGS. 1A and 1B illustrate printing system configuration diagrams according to a first exemplary embodiment of the present invention.

FIG. 1A illustrates an exemplary example of a configuration of an information processing apparatus to which the present invention can be applied. In FIG. 1A, to one or more personal computers (hereinafter, referred to as PC) 102, a printer 103 is connected via a network, a cable, or the like.

The PC 102 includes a PDL generation unit 104 that generates a PDL (also referred to as print data or PDF/VT) from a DB 100 that stores various types of data including metadata and a VDP template 101. The PC 102 further includes a PDL processing unit 105 that controls printing based on metadata of the PDL generated by the PDL generation unit 104.

The printer 103 is a printing device that receives data via a network, a cable, or the like.

Figure 1B:
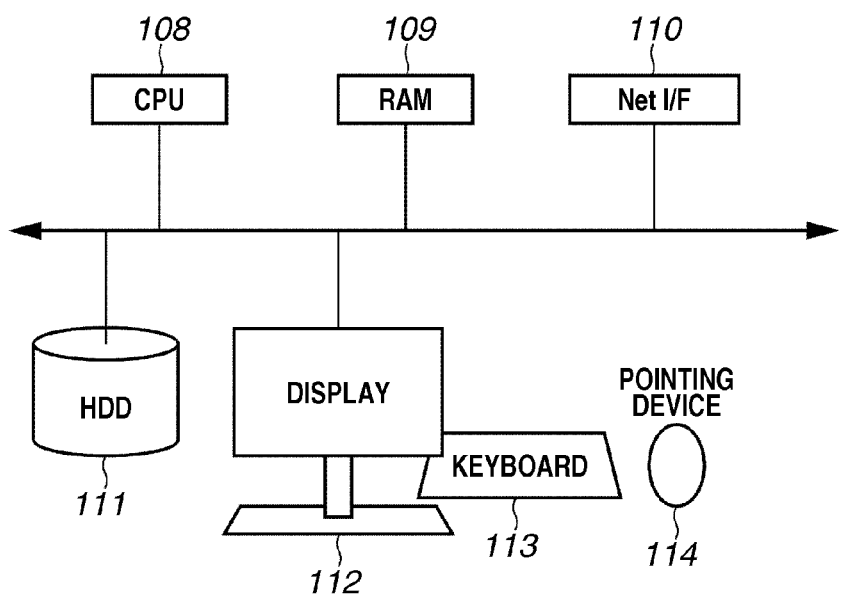

FIG. 1B is a block diagram illustrating an exemplary example of a hardware configuration of the PC 102 according to the exemplary embodiment. The hardware of the PC 102 can use a known configuration having various connection methods, various buses and interfaces. The hardware configuration described below is an exemplary example.

A central processing unit (CPU) 108 performs overall control of the apparatus according to a control program read in a random access memory (RAM) 109. The RAM 109 is an internal storage unit in which the control program of the apparatus to be executed by the CPU 108, documents, data of images, and the like are to be read. A network interface 110 connects to a network such as the Internet under the control of the CPU 108 and transmits and receives data or the like. A hard disk drive (HDD) 111 stores various types of data such as control software of the PC 102. Reference number 112 denotes a display, reference number 113 denotes a keyboard, and reference numeral 114 denotes a pointing device such as a mouse.

The various types of software stored in the HDD 111 is read into the RAM 109 as needed, uses functions of an operating system read also into the RAM 109 as needed, and is executed under the control of the CPU 108.

Figure 2:
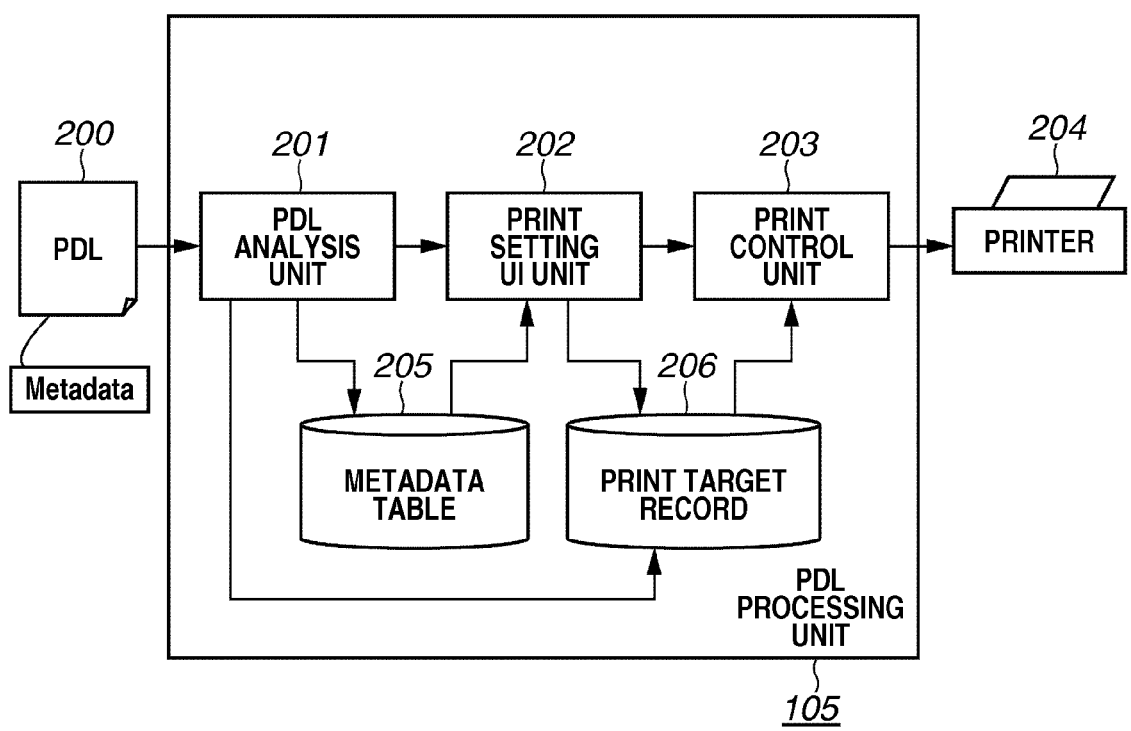
FIG. 2 illustrates a processing configuration diagram of a PDL processing unit in the printing system according to the first exemplary embodiment.

FIG. 2 illustrates a module configuration of the PDL processing unit. The PDL processing unit 105 in FIG. 1A includes a PDL analysis unit 201, a print setting UI unit 202, and a print control unit 203.

FIG. 3A illustrates a structure of a PDL to be input into the PDL processing unit. A node 300 in FIG. 3A is a root node in metadata of a hierarchical structure. Nodes in layers lower than the root node 300 can hold any metadata. For example, a node 307 has "male" as a value of a metadata key "sex", and similarly has "333-3333" as a value of a metadata key "zip code".

The root node 300 stores information 309 for specifying a layer level for performing iterative processing in variable printing. The unit for performing the iterative processing is referred to as a record, and the layer level for performing the iterative processing is referred to as a record level or a recipient level. A record level 309 shows a depth of the layer for performing the iterative processing with root nodes 301 to 304 as zero.

The PDL analysis unit 201 analyzes a file structure of the PDL, and specifies a record level 309 that is a layer level for performing the iterative processing from the root node 300 of the metadata. Then, the PDL analysis unit 201 extracts a key of the metadata and a value from the layer (in FIG. 3A, a layer 310) indicated by the specified record level 309.

The PDL illustrated in FIG. 3A also includes rendering data 319 (for example, PDF data) that is to be used for printing, and the PDL data is also referred to as print data.

The PDL analysis unit 201 generates data (hereinafter, referred to as a metadata table) 205 that describes a corresponding relationship between the key of the metadata and the value from the key of the metadata and the value in the extracted record level, and stores the data 205 in the PDL processing unit 105. FIG. 4A illustrates an exemplary example of the metadata table in the PDL in FIG. 3A.

A cell 400 corresponds to a node 305 in FIG. 3A, and a number "0001" indicating a unique record is stored. The record number is allocated by performing breadth-first search beginning at the root node 300 of the metadata having the hierarchical structure, and in the order determined that the record corresponds to the record level 309.

Similarly, a cell 401 stores "male" for a value of the metadata key "sex" contained in the node 305. A cell 402 stores "111-1111" for a value of the metadata key "zip code" contained in the node 305.

The PDL analysis unit 201 generates a record (hereinafter, referred to as a print target record) 206 that is to be a print target in the extracted records in the record level, and stores the record in the PDL processing unit 105.

FIG. 4B illustrates an exemplary example of the print target records. In the exemplary example, a cell 403 stores a record number "0001", and a cell 404 stores a record number "0003". The above-mentioned record numbers correspond to the record numbers in FIG. 4A. In the print target records, the records "0001" and "0003" in FIG. 4A are the targets of the print.

Figure 5A:
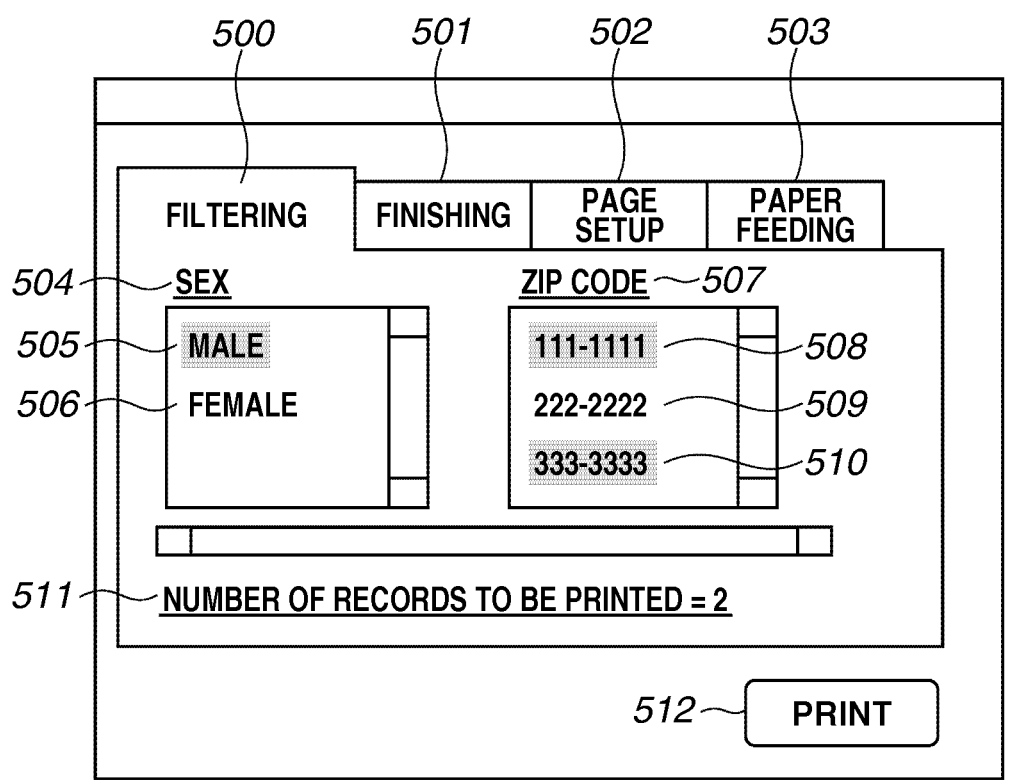

The print setting UI unit 202 refers to the keys of the metadata and values in the record level from the metadata table 205 generated by the PDL analysis unit 201, and displays on a list box of a print setting UI. The print setting UI unit 202 controls the display of the print setting UI, and is also referred to as a display control unit. FIG. 5A illustrates an exemplary example of the display of the print setting UI. On the display, specification of metadata and the like are received. Tabs 500 to 503 are for activating functional setting of the print setting UI in the printer driver. A screen for setting a function corresponding to the selected tab is displayed. Hereinafter, a case where the tab 500 for a filtering function is activated is described.

Names 504 and 507 at upper parts of the list boxes show the key names in the metadata table in FIG. 4A.

Values 505 and 506 correspond to values of the metadata key, "sex" in the metadata table in FIG. 4A. The print setting UI unit 202 extracts "male" and "female" as values that do not overlap with each other from the sex key in the metadata table in FIG. 4A, and displays on the list box in the print setting UI.

When the print setting UI unit 202 receives a selection of a metadata value "male" 505, the print setting UI unit 202 changes a background color of the "male" 505.

Similarly, values 508 to 510 show values of the metadata key "zip code" in the metadata table in FIG. 4A. The print setting UI unit 202 displays "111-1111", "222-2222", and "333-3333" on the list box of the print setting UI.

When the print setting UI unit 202 receives selection of the metadata values "111-1111" 508 and "333-3333" 510, the print setting UI unit 202 changes a background color of the values selected in the list box.

FIG. 5B illustrates an exemplary example of providing checkboxes 513 and 514 for printing a record that has metadata other than the selected metadata. In the case of FIG. 5B, the checkbox 513 is not checked. Then, the print setting UI unit 202 determines that the record having the value of "male" for the metadata key "sex" is specified.

Meanwhile, the checkbox 514 is checked. Accordingly, the print setting UI unit 202 determines that the records whose values of the metadata key "zip code" are not "111-1111" are specified. As a result, the print setting UI unit 202 registers the record whose value of the metadata key "sex" is male and values of the metadata key "zip code" are not "111-1111" in the print target record 206. If the values of the metadata of all records in the metadata table 205 are the same, the print setting UI unit 202 does not display the metadata on the list boxes of the print setting UI.

FIG. 6 illustrates an exemplary example of not displaying common metadata on a list box of the print setting UI if the values of the metadata in the all records in the metadata table 205 are common. In values 601 in FIG. 6, in records 0001 to 0004, the value of the metadata key "zip code" are the same value "111-1111". Then, the print setting UI unit 202 can select not to display the key of the "zip code" and the values on the list box on the print setting UI.

The print setting UI unit 202 displays the number of records stored in the print target record 206 generated by the PDL analysis unit 201 on the print setting UI (see the number of records to be printed 511 in FIG. 5A). If the number of the records is zero, the print setting UI unit 202 displays a warning message on the print setting UI. If the print setting UI unit 202 receives pressing of a print button 512 in a state where the number of the print target records is zero, the print setting UI unit 202 displays a window for warning that the number of the print target records is zero. Alternatively, the print setting UI unit 202 can forbid operation of the print button 512 when the number of the print target records is zero.

If the print control unit 203 receives the pressing of the print button 512 when the number of the print target records is greater than zero, the print control unit 203 extracts records (in FIG. 4B, the records 305 and 307 corresponding to the "0001" 403, and "0003" 404) described in the print target record 206, and prints the records. In the exemplary embodiment, the processing for printing a record (or a page) extracted according to a condition is referred to as filtering printing.

Figure 7:
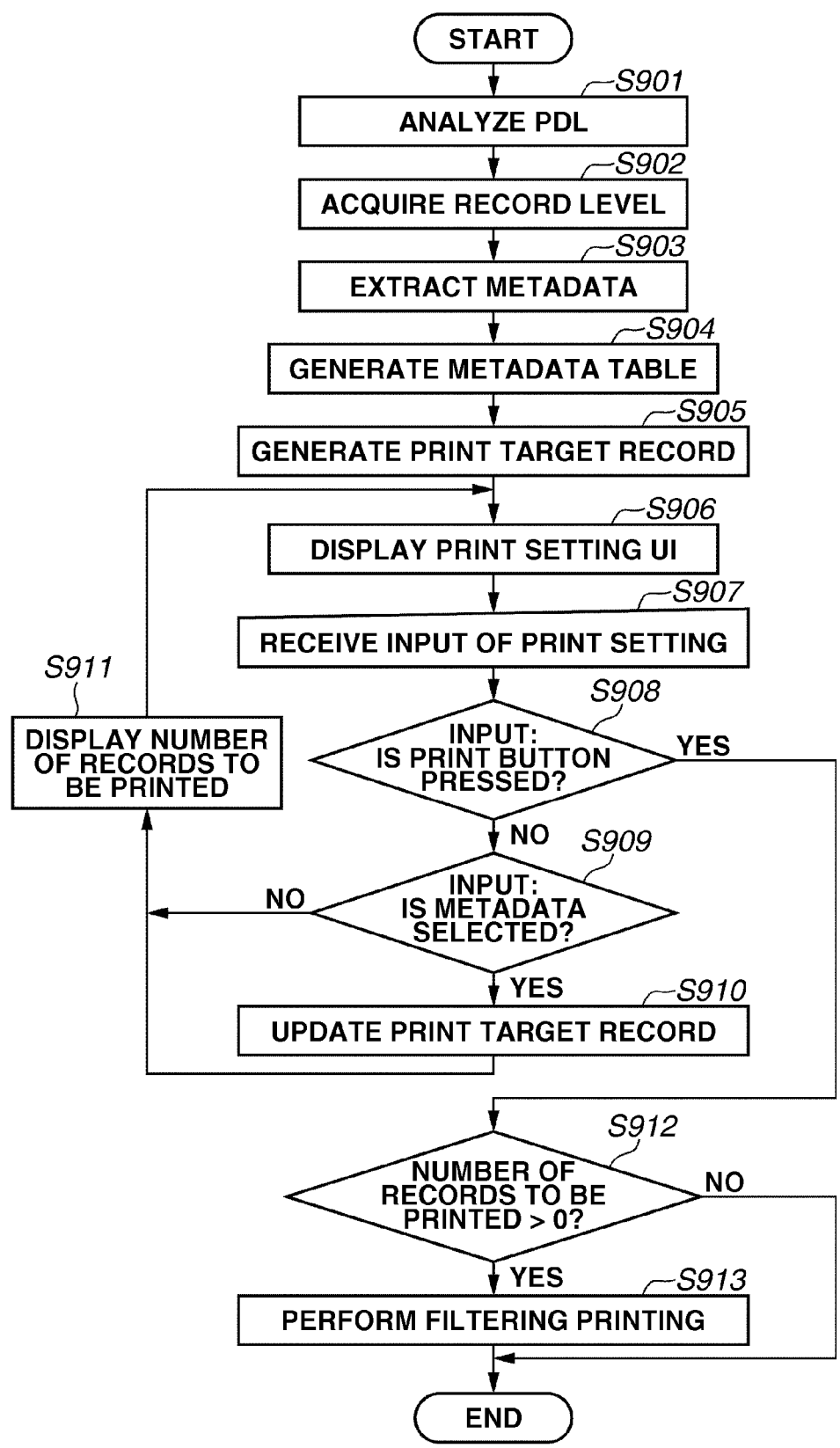
FIG. 7 illustrates a flowchart according to the first exemplary embodiment.

FIG. 7 is a flowchart illustrating processing of the PDL processing unit 105 according to the first exemplary embodiment of the present invention. The flowchart according to the exemplary embodiment is implemented by a central processing unit (CPU) 108 by reading out a program concerning the processing in the flowchart from a memory and executing the program.

In step S901, the PDL analysis unit 201 analyzes a PDL containing metadata.

In step S902, the PDL analysis unit 201 acquires (specifies) the record level 309 stored in the root node 300.

In step S903, the PDL analysis unit 201 extracts keys of the metadata and values (for example, the keys and the values 311 to 314 in FIG. 3A) from the layer 310 of the PDL specified by the record level acquired (specified) in step S902.

In step S904, the PDL analysis unit 201 generates the metadata table 205 that describes a corresponding relationship between the keys of the metadata and the values in the record level extracted in step S903, and holds the table.

In step S905, the PDL analysis unit 201 generates the print target record 206 that is to be a print target in the record 310 in the record level extracted in step S903, and holds the record. At the step, all records are the print target records. Accordingly, for example, in the exemplary example in FIG. 4A, the records 0001 to 0004 are held as the print target records.

In step S906, the print setting UI unit 202 displays the keys of the metadata and the values stored in the metadata table 205 on the print setting UI. As a result, for example, the keys 504 and 507, the values 505 and 506, and the values 508 to 510 in FIG. 5A are displayed on the print setting UI. In the step, the number of records stored in the print target record 206 is displayed on the print setting UI.

In step S907, the print setting UI unit 202 receives an input to the print setting UI.

In step S908, the print setting UI unit 202 determines whether the input received in step S907 is input to the print button 512.

If the input to the print button 512 is received (YES in step S908), the processing proceeds to step S912. If the input to the print button 512 is not received (NO in step S908), the processing proceeds to step S909.

In step S909, the print setting UI unit 202 determines whether the input received in step S907 is selection of metadata.

In step S909, if it is determined that the input is selection of metadata (YES in step S909), the record having the metadata specified in step S909 is written in the print target record 206. For example, if the metadata, "male" in FIG. 5A is selected, the records 0001 and 0003 are written in the print target record as illustrated in FIG. 4B.

In step S911, the print setting UI unit 202 displays the number of records stored in the print target record 206 on the print setting UI. As a result, for example, in FIG. 4B, if the metadata "male" is selected, the two records, that is, the records 0001 and 0003 are extracted. Accordingly, as illustrated in FIG. 5A, "the number of records to be printed=2" (511) is displayed.

In step S912, the print setting UI unit 202 determines whether the number of records stored in the print target record 206 is greater than zero. If the number of records is greater than zero (YES in step S912), the processing proceeds to step S913.

In step S913, the print control unit 203 instructs the printer 103 to print the records stored in the print target record 206 in the records contained in the PDL. That is, in the exemplary example, FIG. 4A, the records 0001 and 0003 out of the records 0001 to 0004 are determined to be the records to be printed.

As described above, in the processing according to the first exemplary embodiment of the present invention, by implementing the filtering printing for selectively printing the records which the user needed by using the metadata in the PDL, the present invention can reduce the burden of the user, for example, burden of preparing print instruction data such as a JDF in advance to specify the print target record. That is, the filtering printing can be easily performed.

In the metadata table in FIG. 4A, there is no record that has both of the sex "male" and the zip code "222-2222". Accordingly, for example, at the step where the sex "male" in FIGS. 5A and 5B is selected, the display can be made to forbid selection of the zip code "222-2222".

In the first exemplary embodiment of the present invention, the exemplary example of allowing all metadata of the records in the record level of the PDL to be the target of the selection in the filtering printing has been described. However, when the number of keys of the metadata contained in the record level of the PDL is large, the number of list boxes provided on the print setting UI is also large. Then, the user may mistakenly select metadata.

To solve the problem, a checkbox for specifying whether metadata is to be used for the filtering for printing is provided on the print setting UI to enable specification of the metadata to be used for the filtering out of all metadata in the records in the record level.

Figure 8:
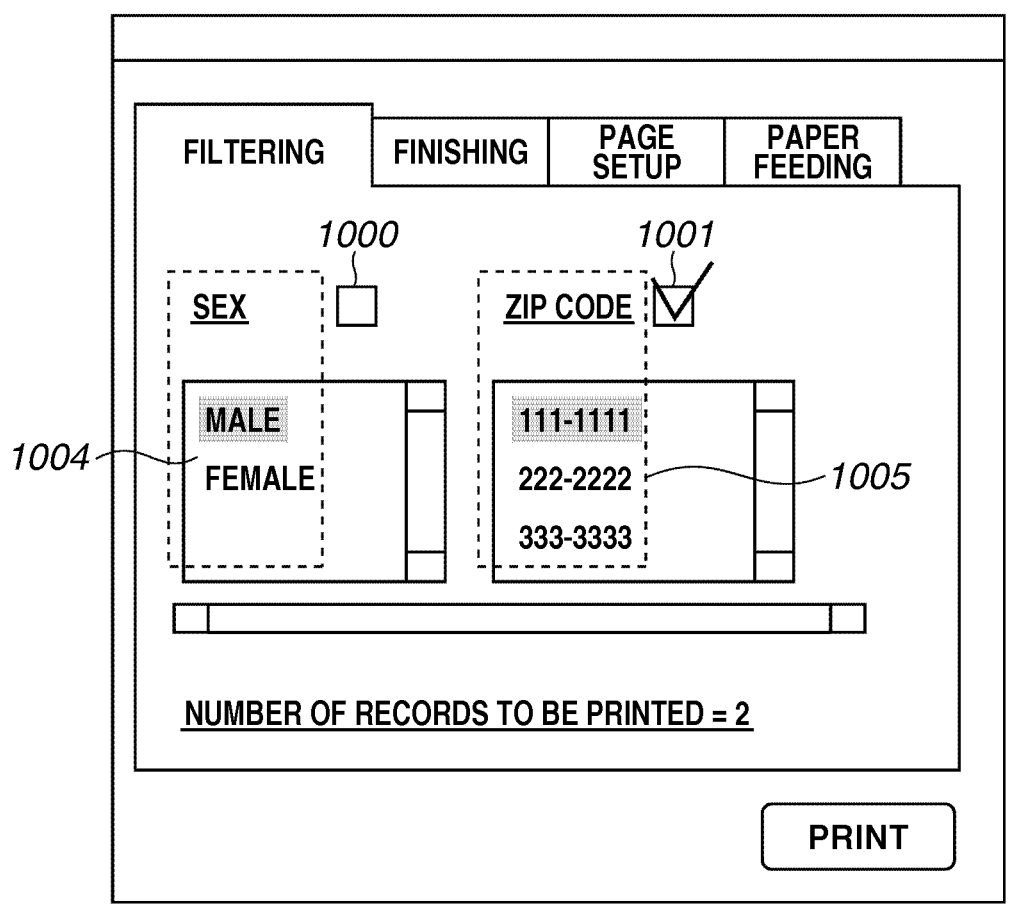
FIG. 8 illustrates a print setting UI according to a second exemplary embodiment of the present invention.

FIG. 8 illustrates an exemplary example of the display of the print setting UI according to the second exemplary embodiment of the present invention.

Checkboxes 1000 and 1001 in FIG. 8 are used to specify whether a value of a corresponding metadata key is used for the print filtering.

In the drawing, the checkbox 1000 is not checked. Accordingly, the print setting UI unit 202 performs processing such that selection of metadata is not received. For example, grayout processing is performed to metadata 1004 such that the selection of the metadata 1004 is not received. The method is not limited to the grayout processing as long as a method for forbidding the selection is employed. Moreover, for example, even if the selection of the metadata 1004 is received, if the checkbox 1000 is not checked, the selection of the metadata 1004 is invalidated.

Further, the checkbox 1001 is checked. Accordingly, the print setting UI unit 202 validates metadata 1005 such that the selection of the value of the metadata key, "zip code" is received.

As described above, by providing the checkboxes, even if the number of keys of the metadata is increased, an erroneous operation of the user can be prevented.

In the first exemplary embodiment of the present invention, the exemplary example of allowing only the metadata of the records in the record level of the PDL to be the target of the selection in the filtering printing has been described. However, when grouping is performed by target metadata contained in a parent element of the record level of the PDL, it is not possible to use such information for print control.

To solve the above problem, a checkbox for specifying whether the metadata of the parent element of the record level is to be used for the filtering for printing is provided on the print setting UI to enable specification of the metadata of the parent element of the record level to be used for the filtering. FIGS. 10A and 10B illustrate exemplary examples of the print setting UI according to the third exemplary embodiment of the present invention.

FIG. 10A shows an exemplary example of a checkbox 1300 not being checked. The checkbox 1300 is for specifying whether the metadata of the parent element of the record level is to be used for the filtering of the printing. In this case, the metadata of the parent layer of the record level is not used. Accordingly, similarly to the first exemplary embodiment, the print setting UI unit 202 displays only the metadata in the record level on the list box.

On the other hand, FIG. 10B shows an exemplary example of a checkbox 1303 being checked. The checkbox 1303 is for specifying whether the metadata of the parent element of the record level is to be used for the filtering of the printing. In this case, the print setting UI unit 202 generates the metadata table 205 by using the metadata in the record level and the metadata of the parent element of the record level.

FIG. 9 illustrates an exemplary example of the generation of the metadata table 205 using the metadata in the record level and the metadata of the parent element of the record level.

With respect to metadata 1202 and 1203, the print setting UI unit 202 stores keys of the metadata and values in the metadata table similarly to the first exemplary embodiment. As a result, keys of the metadata and values 1205 are stored in the metadata table.

The print setting UI unit 202 copies metadata 1200 and 1201 of the parent element of the record level according to the parent-child relationship with the metadata in the record level to the metadata table. As a result, the keys of the parent element of the metadata and values 1204 are stored in the metadata table.

Then, the print setting UI unit 202 displays the metadata stored in the metadata table 1206 on list boxes 1306 in FIG. 10B.

If the print setting UI unit 202 receives specification of metadata to be used for the filtering, writes the record having the specified metadata in the print target record 206.

In the exemplary example in FIG. 10B, the checkbox 1303 for specifying whether the metadata of the parent element of the record level is to be used for the filtering is checked, and a value "10's" of a metadata key "age group" is selected.

Accordingly, the print control unit 203 performs the filtering print processing to records 305 and 306 that have the value of "10's" for the metadata key "age group" out of the record 310 in the record level.

Figure 11:
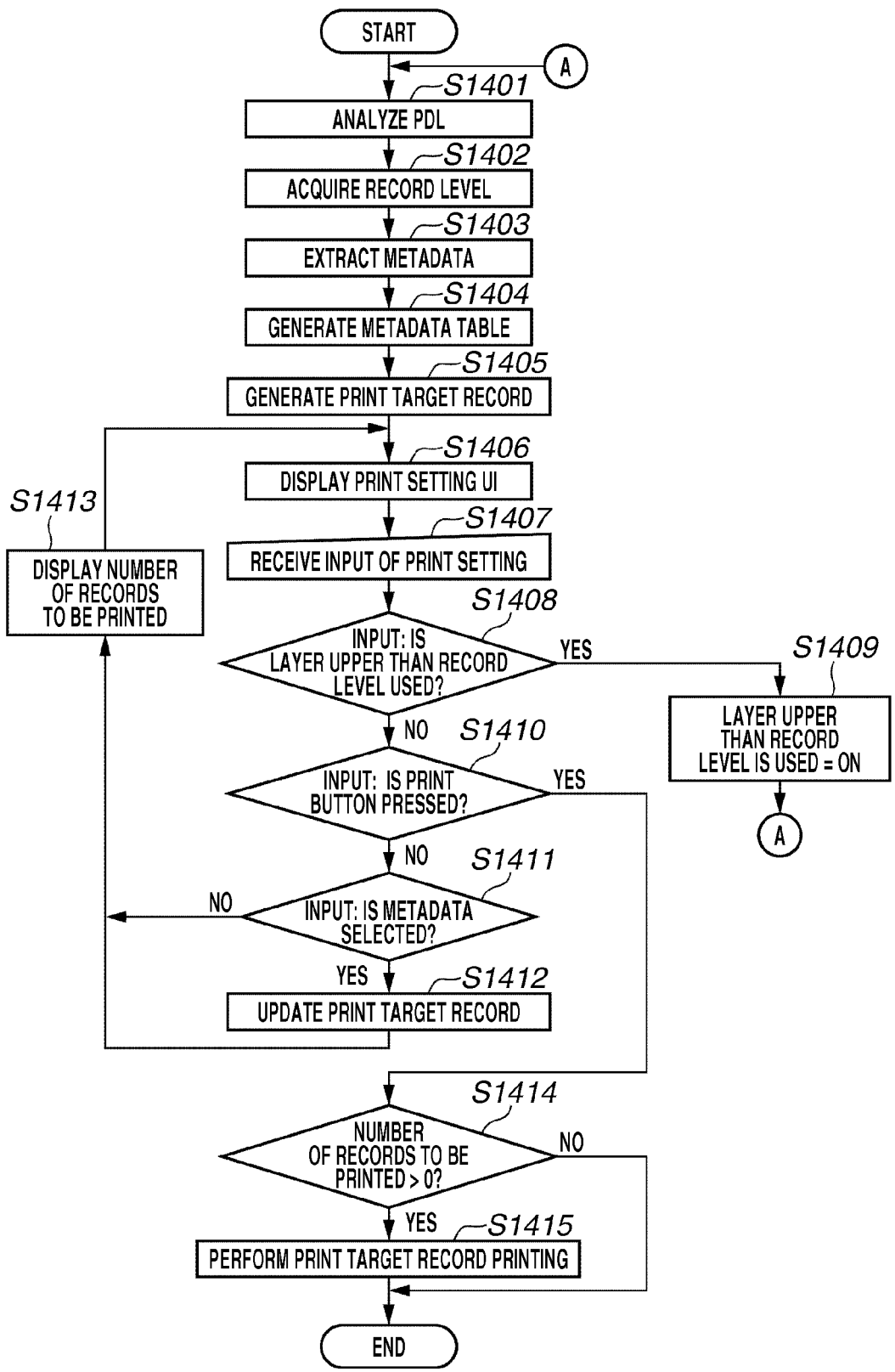
FIG. 11 illustrates a flowchart according to the third exemplary embodiment.

FIG. 11 is a flowchart illustrating processing of the PDL processing unit 105 according to the third exemplary embodiment of the present invention.

Steps S1401 to S1407 and S1410 to S1415 are the same as those in FIG. 7. Accordingly, the descriptions of the steps are omitted.

However, in step S1403, if a flag for specifying the use of the metadata of the parent element of the record level for the filtering is set, the PDL analysis unit 201 extracts the keys of the metadata of the parent element and values 315 to 318 together with the metadata in the record level.

In step S1408, the print setting UI unit 202 determines whether the checkbox for specifying whether the metadata of the parent element is to be used for the filtering is checked. If the checkbox is checked (YES in step S1408), the processing proceeds to step S1409. If the checkbox is not checked (NO in step S1408), the processing proceeds to step S1410.

In step S1409, the print setting UI unit 202 sets the flag for specifying the use of the metadata of the parent element of the record level for the filtering, and the processing proceeds to (A).

By performing the above-described processing, it is possible to specify whether to use not only the metadata in the record level but also the metadata of the parent element of the record level for the filtering for printing.

As a result, in the case grouping is performed by the metadata in the parent element of the record level, the filtering printing using the grouping information can be performed.

In the description above, the metadata of the parent element of the record level has been described. However, metadata in a layer upper than the parent element of the record level can also be included as a target of the filtering. For example, if the PDL in FIG. 3B is given, not only the record 321 in the record level and the record 320 of the parent element of the record level, but also metadata of the parent element record 322 of the parent element of the record level can be included as the target of the filtering.

In the first exemplary embodiment of the present invention, the exemplary example of using only the metadata of the records in the record level of the PDL for the target of the control in the filtering printing has been described. However, if target metadata of a child element of the record level of the PDL includes useful information for the filtering, it is not possible to use the information for the printing.

FIG. 12 illustrates data structure of a PDL having metadata of a key of "print mode" in a layer of a child element of a record level. In the first exemplary embodiment, only the metadata in the record level is used. Accordingly, it is not possible to perform the printing using values in a metadata key "print mode" 1505.

To solve the problem, a checkbox for specifying whether the metadata of the child element of the record level is to be used for the filtering for printing is provided on the print setting UI to enable specification of the metadata of the child element of the record level to be used for the filtering.

FIGS. 13A and 13B illustrate metadata tables that can be obtained by inputting the PDL in FIG. 12.

Figure 15A:
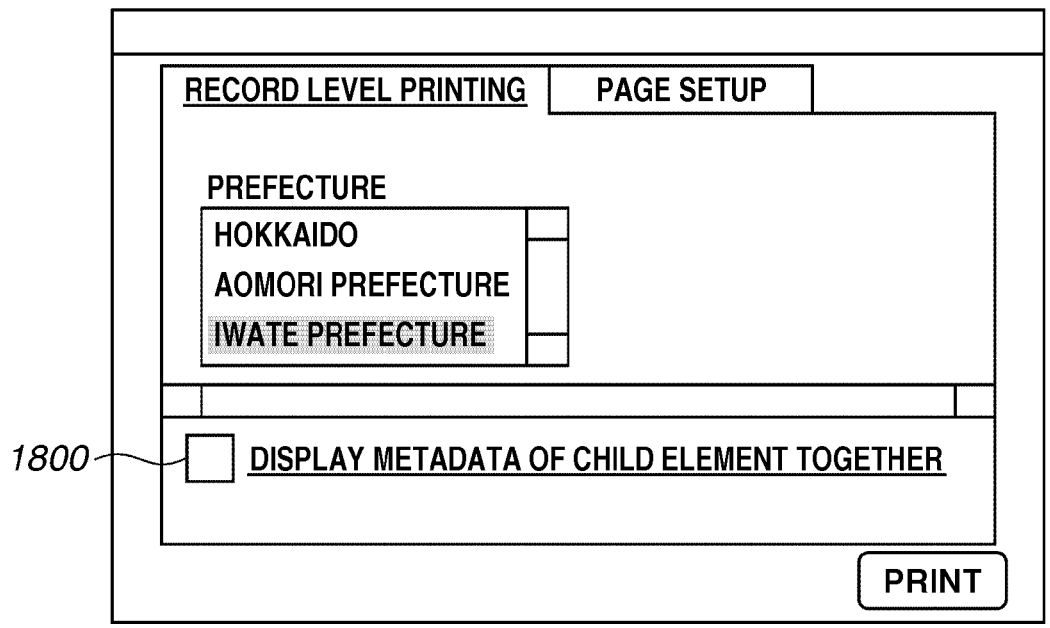
FIGS. 15A to 15C illustrate print setting UIs according to the fourth exemplary embodiment.

FIG. 15A shows an exemplary example of a checkbox 1800 for specifying whether the metadata of the child element of the record level is to be used for the filtering of printing not being checked.

The print setting UI unit 202 displays values of a metadata key "prefecture" in the layer of the record level on a list box on the print setting UI, and receives specification of metadata to be used for the filtering. The print setting UI unit 202 determines that a record that has "Iwate prefecture" for the value of the metadata key "prefecture" is specified to be the print target record, and registers a record 1504 in the print target record 206.

In the exemplary example of FIG. 15A, if the print control unit 203 receives pressing of the print button, performs the filtering printing with respect to the record 1504.

Figure 15B:
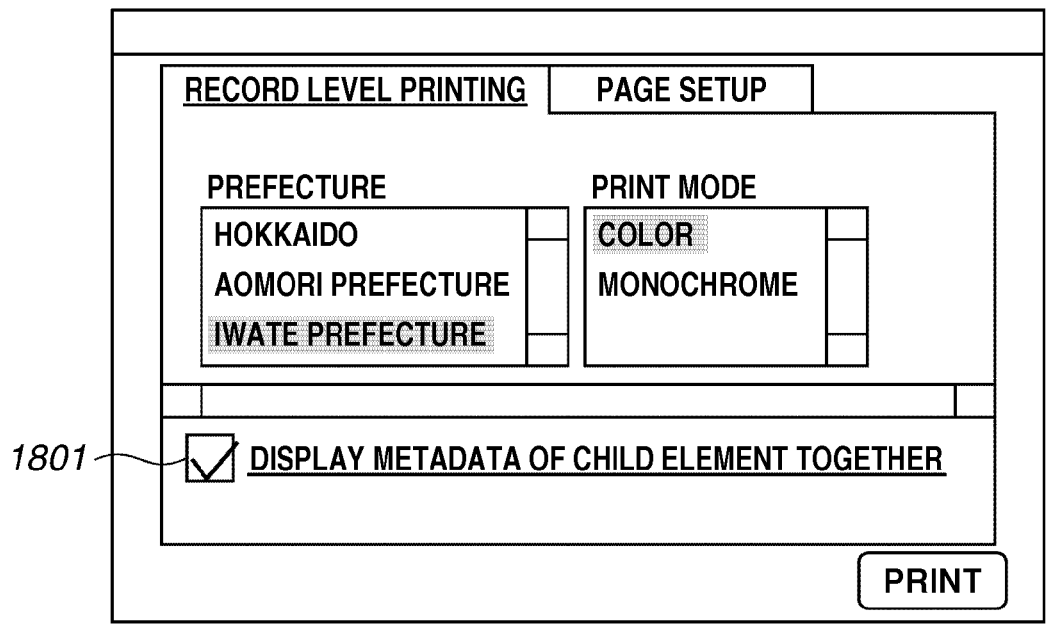

On the other hand, FIG. 15B shows an exemplary example of a checkbox 1801 for specifying whether the metadata of the child element of the record level is to be used for the filtering of printing being checked. FIG. 15B illustrates an exemplary example of a case where conflict of print modes in the metadata of the child element of the record level does not occur.

The conflict of the print modes is described below. FIG. 13A illustrates an exemplary example of a case where there is no conflict of the print modes in the metadata of the child element of the record level. In the metadata table in FIG. 13A, as indicated in print modes 1600 to 1602, in all records, the print modes in pages one to three are the same. Accordingly, the conflict does not occur. On the other hand, FIG. 13B illustrates an exemplary example of a case where the conflict of the print modes in the metadata of the child element of the record level occurs. In the metadata table in FIG. 13B, as indicated in a print mode 1604, in a record 0002, the print mode is "monochrome" in the pages one and three, but the print mode is "color" in the page two. Accordingly, in the same record, the print modes are not unified. Such a state means there is a conflict in the print mode.

The description will follow by referring to FIG. 15B again. If there is no conflict in the print modes in the child element, the print setting UI unit 202 displays the metadata "prefecture" in the layer of the record level on a list box on the print setting UI according to the check of the checkbox 1801. Further, the print setting UI unit 202 displays metadata "print mode" in the layer of the child element of the record level on a list box on the print setting UI.

In the exemplary example in FIG. 15B, the print setting UI unit 202 determines that a record that has "Iwate prefecture" of "prefecture" and "color" of "print mode" is specified to be the print target record, and registers the record 1504 in the print target record 206.

If the print control unit 203 receives pressing of the print button, the print control unit 203 performs the filtering printing with respect to the record 1504 that is specified in the record 206.

Figure 15C:
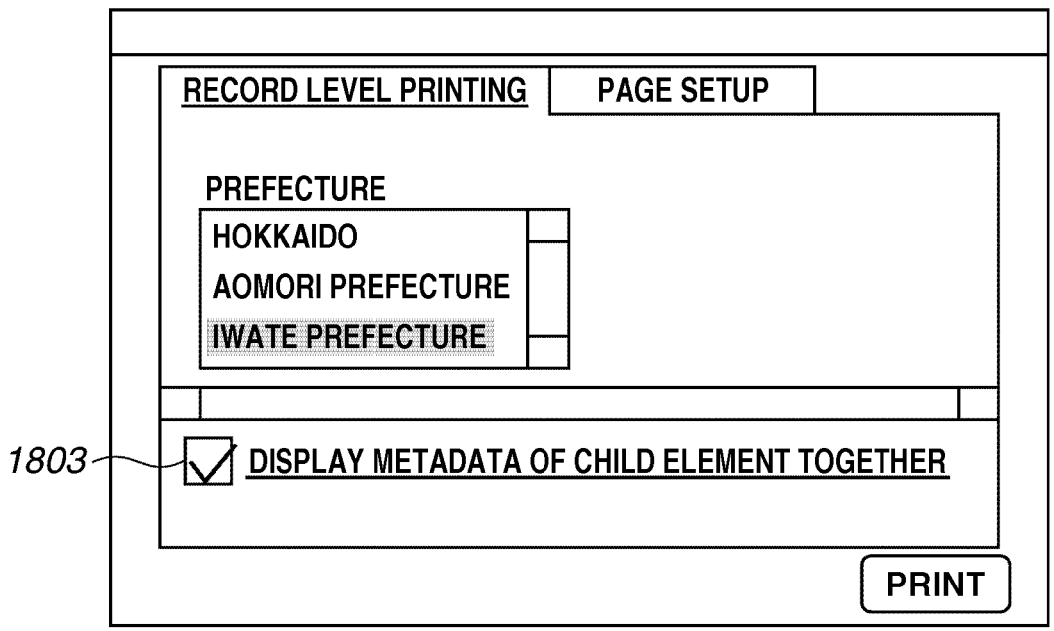

FIG. 15C illustrates an exemplary example of a case where there is a conflict of the print modes in the child element. In the exemplary example, a checkbox 1803 is checked. However, the conflict occurs in the metadata of the child element, and a list box of the print modes is not displayed on the print setting UI. This is to prevent printing by the record unit from being impracticable.

If the child element has a plurality of pieces of metadata, and there is a conflict between some pieces of the metadata but there is no conflict in the other pieces of the metadata, the other pieces of the metadata are displayed on the list box.

In the exemplary example in FIG. 15C, the print setting UI unit 202 registers the record 1504 that has "Iwate prefecture" of "prefecture" in the print target record 206.

Figure 14:
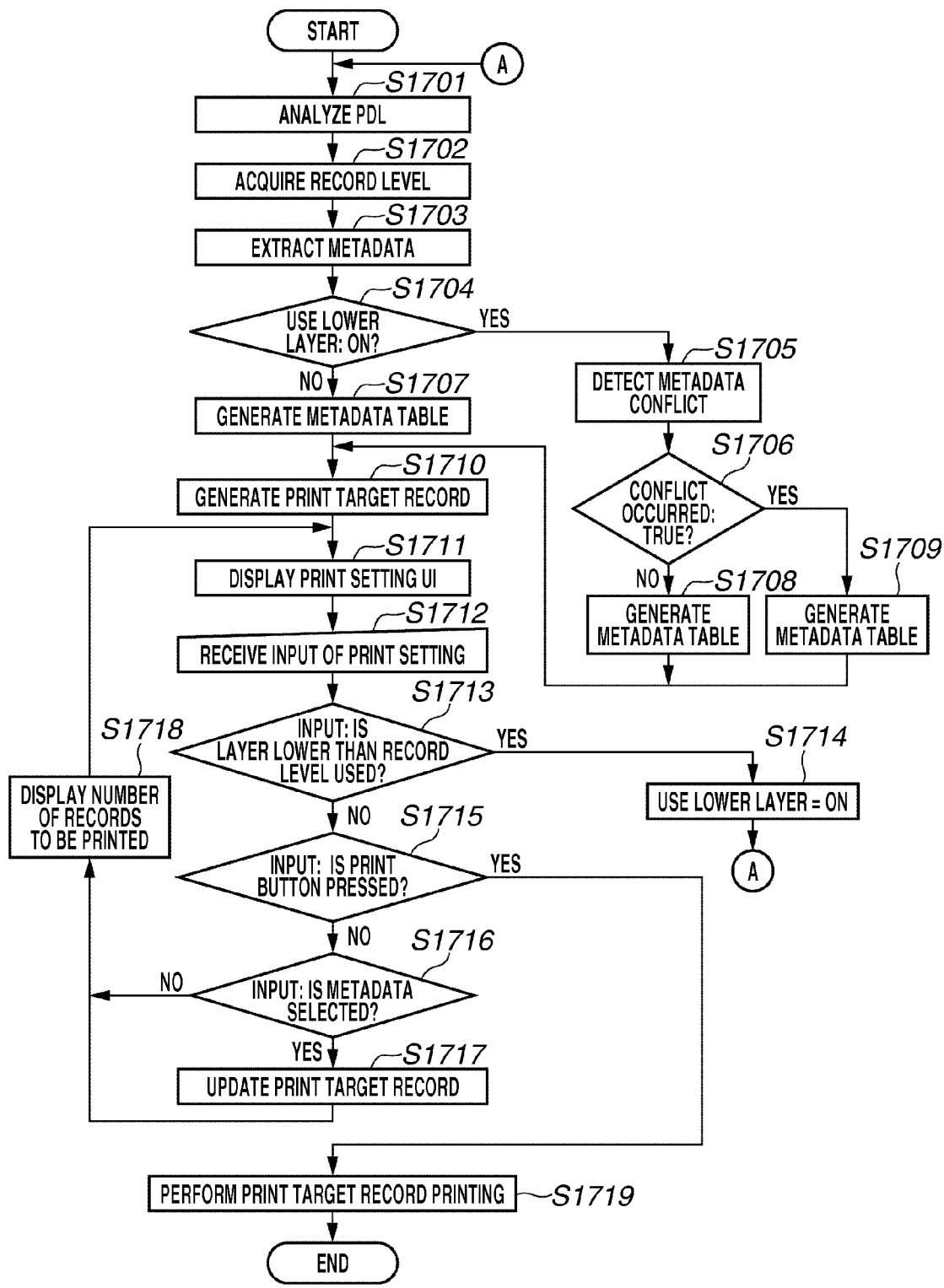
FIG. 14 illustrates a flowchart according to a fourth exemplary embodiment of the present invention.

FIG. 14 is a flowchart illustrating processing of the PDL processing unit 105 according to the fourth exemplary embodiment of the present invention. Points different from FIG. 7 are described.

In step S1704, the PDL analysis unit 201 determines a flag for determining whether to use metadata of a level lower than the record level for the filtering. If the flag is set (YES in step S1704), the processing proceeds to step S1705. If the flag is not set (NO in step S1704), the processing proceeds to step S1707.

In step S1705, the PDL analysis unit 201 detects a conflict of the metadata in the level lower than the record level. More specifically, the conflict of the metadata is detected by determining whether the metadata in each page in the same record is unified.

In step S1706, if the PDL analysis unit 201 determines that the conflict occurs in the metadata conflict determination in step S1705 (YES in step S1706), the processing proceeds to step S1709. If it is determined that the conflict of the metadata does not occur in step S1706 (NO in step S1706), the processing proceeds to step S1708.

In step S1708, the PDL analysis unit 201 generates a metadata table from keys of the metadata and values of the record level acquired in step S1702 and the child layer of the record level.

In step S1709, the PDL analysis unit 201 generates a metadata table from the keys of the metadata and the values of the record level. In FIG. 13B, the metadata table is generated in the state that the conflict of the metadata of the child element is included. However, the drawing is for the purpose of description, and the metadata table is not actually generated. Even if the metadata table is generated, the metadata of the child element in the conflict is not used.

In step S1713, the print setting UI unit 202 determines whether to use the metadata of the child element of the record level for the filtering. If the metadata is to be used (YES in step S1713), the processing proceeds to step S1714. In step S1714, the flag for using the metadata of the child element of the record level is turned on. If the metadata of the child element is not used for the filtering (NO in step S1713), the processing proceeds to step S1715. More specifically, the determination is made by the print setting UI by determining whether the checkbox 1800 in FIG. 15A is checked.

By performing the above-described processing, it is possible to specify whether to use not only the metadata in the record level but also the metadata of the child element of the record level for the filtering for printing.

Accordingly, it is possible to perform the filtering printing using the information of the metadata of the child element of the record level.

Figure 21:
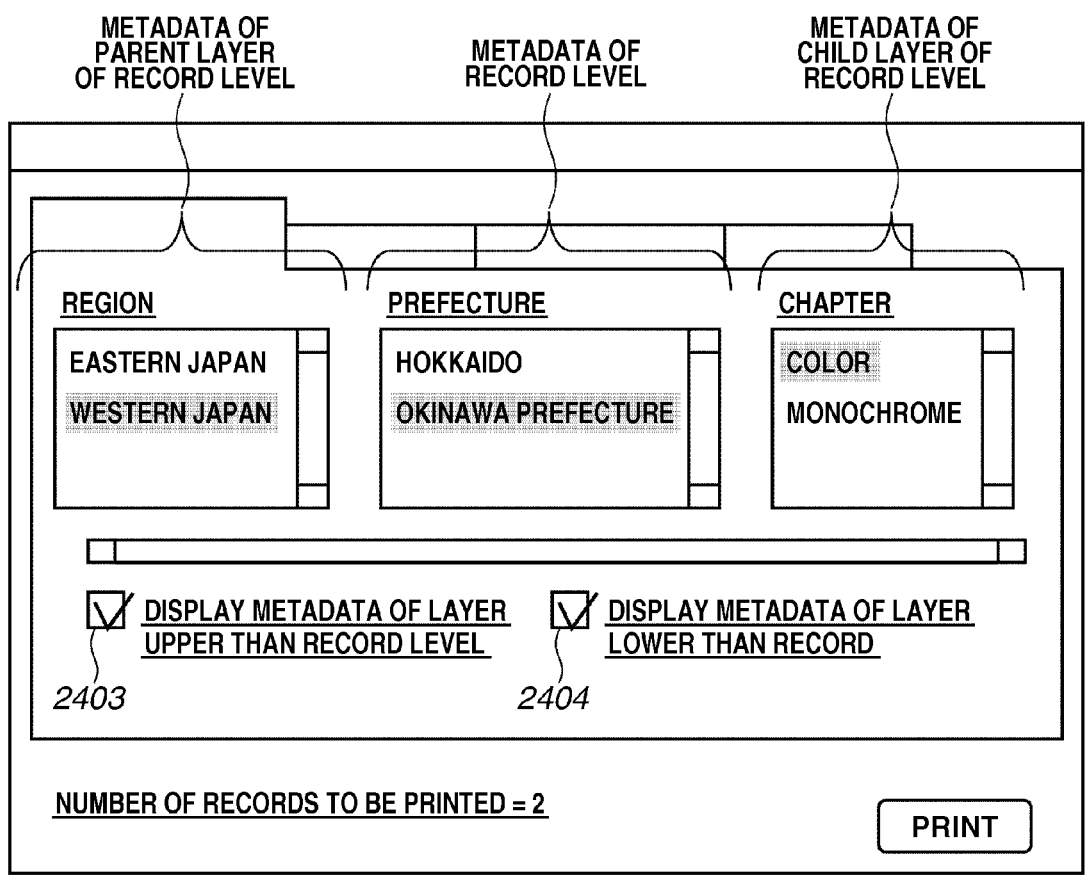
FIG. 21 illustrates a print setting UI according to the fourth exemplary embodiment.

The third and fourth exemplary embodiments of the present invention can be performed at the same time. FIG. 21 illustrates a print setting UI in a case of inputting the PDL illustrated in FIG. 19 in such a state.

Figure 19:
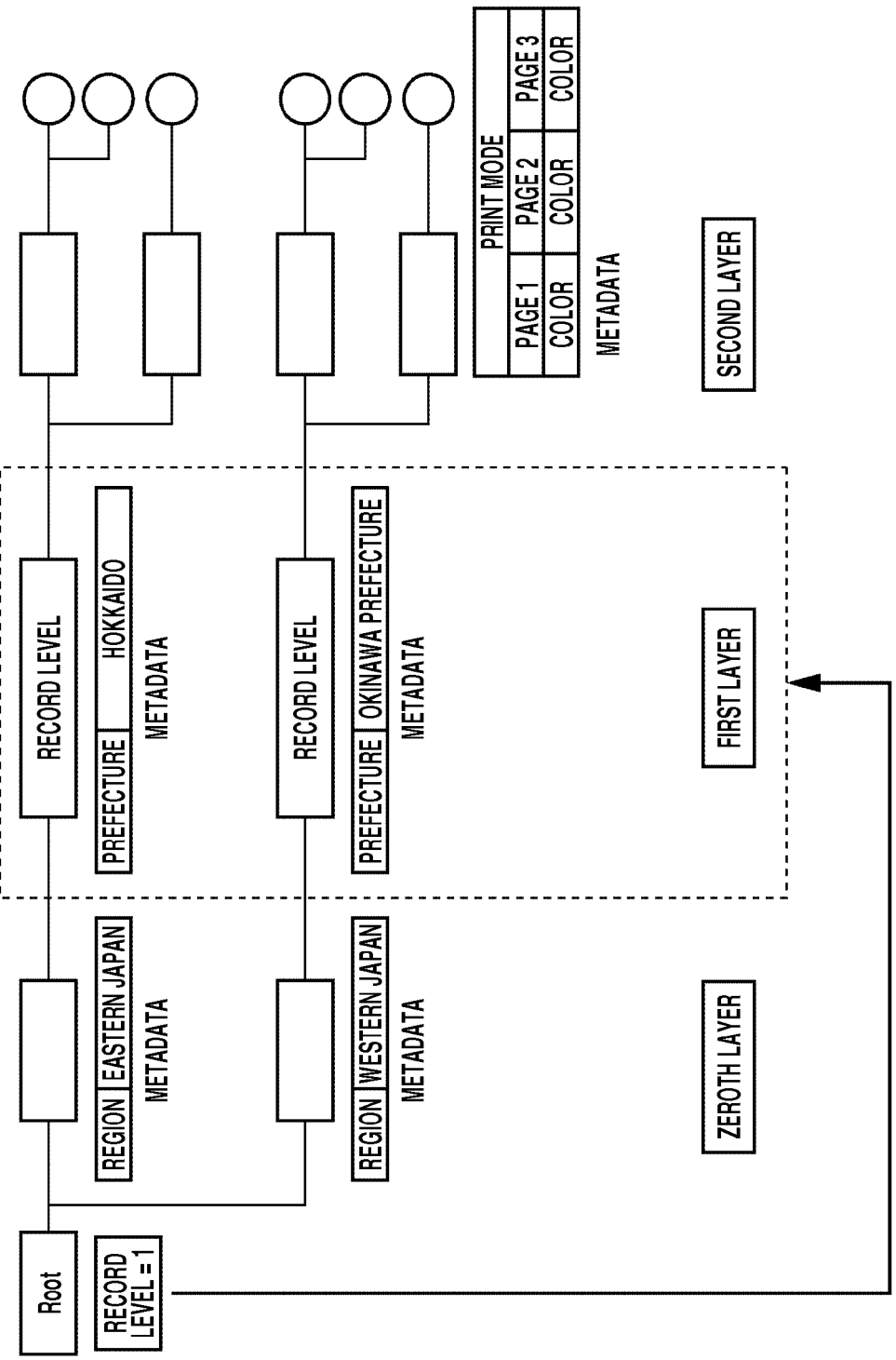
FIG. 19 illustrates a PDL structure diagram according to the fifth exemplary embodiment.

FIGS. 20A and 20B illustrate metadata tables generated from the PDL in FIG. 19. The metadata tables in FIGS. 20A and 20B includes the metadata of the parent element and the child element of the record level with respect to the metadata table of the record level.

The case where the third and fourth exemplary embodiments are performed at the same time is described. In FIG. 21, the print setting UI includes a checkbox 2403 for specifying whether to use the metadata of the parent element of the record level is to be used for the filtering and a checkbox 2404 for specifying whether to use the metadata of the child element of the record level is to be used for the filtering.

Accordingly, it is possible to specify whether to use metadata of the record level and the metadata of the parent element and the child element of the record level for the filtering.

In the exemplary example in FIG. 21, "western Japan" is selected for a value of a metadata key "region", "Okinawa prefecture" is selected for a value of a metadata key "prefecture", and "color" is selected for a value of a metadata key "print mode".

As a result, the print setting UI unit 202 registers records 0003 and 0004 in FIGS. 20A and 20B in the print target record 206.

As described above, it is possible to perform the filtering printing using not only the metadata of the record level but also the information of the metadata of the parent element and the child element of the record level.

In the fourth exemplary embodiment of the present invention, the exemplary example of using the metadata, which does not conflict with each other in the metadata in the record level of the PDL and the records of the child element of the record level, for the target of the control in the filtering printing has been described.

However, if the metadata of the child element of the record level of the target PDL conflicts with each other, even if the metadata includes useful information for the filtering, it is not possible to use the information for the printing.

FIG. 16 illustrates a data structure of a PDL having metadata "chapter" in a layer of a child element of a record level. In the fourth exemplary embodiment, if a conflict occurs in the metadata of the child element of the record level, it is not possible to control the printing using metadata "print mode" 1903.

To solve the problem, a checkbox for specifying whether to use the metadata of the child element of the record level for the filtering is provided on the print setting UI. If the use of the metadata of the child element is specified and a conflict of the metadata occurs, an UI for subset printing is displayed. As a result, if the conflict of the metadata occurs in the child element of the record level, the metadata of the child element is used for the control of the subset printing.

Figure 18A:
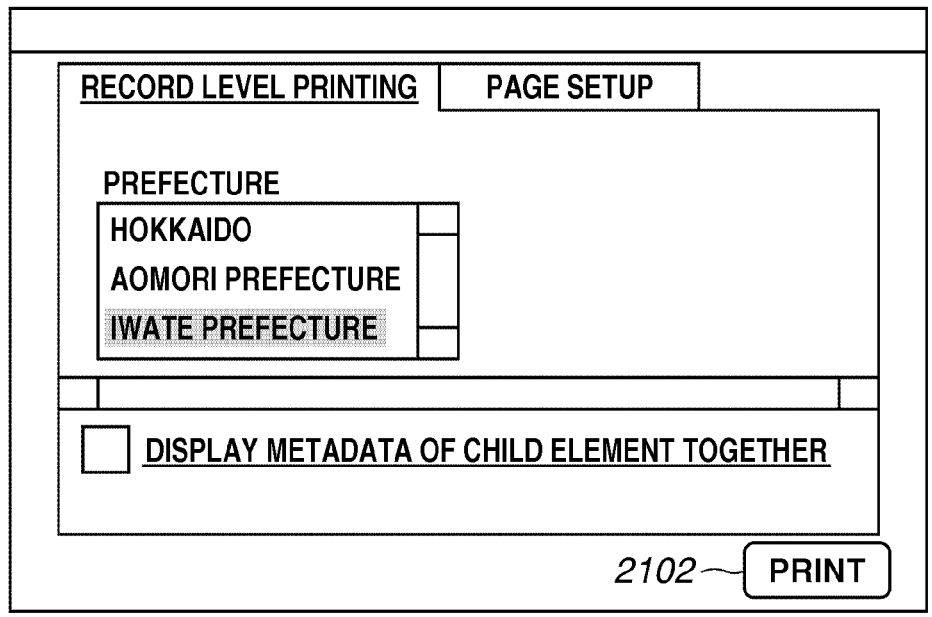
FIGS. 18A and 18B illustrate print setting UIs according to the fifth exemplary embodiment.
Figure 18B:
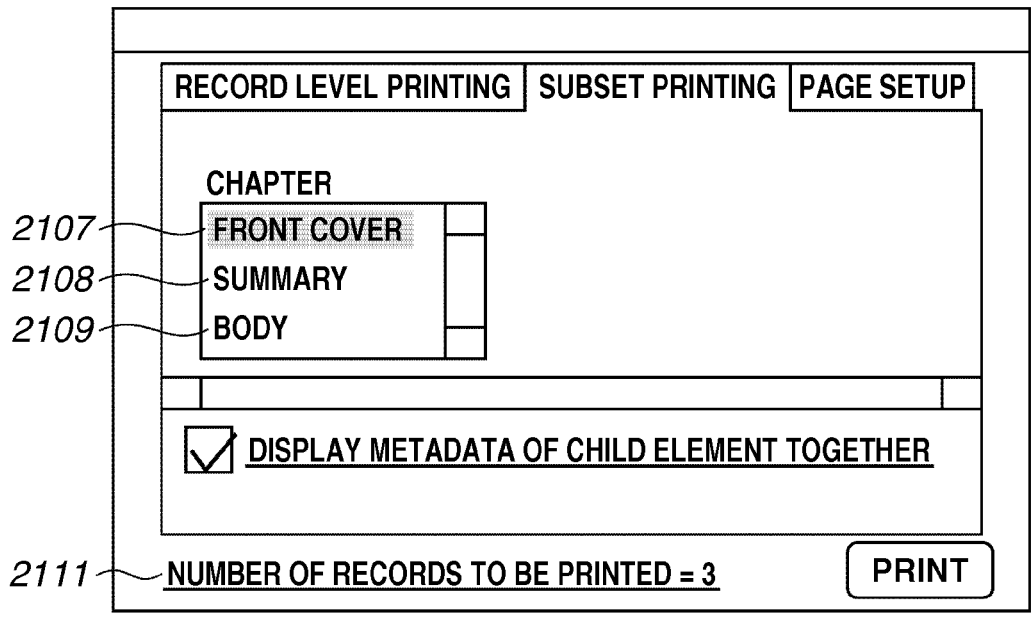

For the purpose, if the print setting UI unit 202 determines that the conflict of the metadata occurs in the child element, the print setting UI unit 202 displays the UI for subset printing in FIG. 18B. More specifically, in FIG. 18A, the setting UI includes two tabs of "record level printing" and "page setup". In FIG. 18B, a third tab of "subset printing" for the subset printing is added.

Metadata 2107 to 2109 in FIG. 18B is metadata of a child element in each record.

Figure 17:
FIG. 17 illustrates a metadata table generation method according to a fifth exemplary embodiment of the present invention.

In FIG. 18B, a front cover 2107 is selected. Accordingly, the page in which the metadata of the front cover is set is printed. That is, the first page of the records 0001 to 0003 in FIG. 17 is printed. Accordingly, in FIG. 18B, "the number of pages to be printed=3" 2111 is displayed at print setting UI.

To specify the metadata, for example, on a screen of the "record level printing", "Hokkaido" can be selected and on the screen of "subset printing", "front cover" can be selected. In such a case, only the first page of the record 0001 in FIG. 17 is printed.

FIG. 22 is a flowchart illustrating processing of the PDL processing unit 105 according to the fifth exemplary embodiment of the present invention.

Points different from FIGS. 7 and 14 are described.

In step S2508, if a conflict of metadata is detected, the PDL analysis unit 201 sets a flag for specifying the use of the metadata of the child layer of the record level.

In step S2509, the PDL analysis unit 201 generates a metadata table that describes a corresponding relationship of keys of the conflicting metadata and values from the records in the child layer of the record level acquired in step S2502.

In step S2518, the print setting UI unit 202 determines whether the flag for specifying the use of the metadata of the child layer for the subset printing is set. If the flag is set (YES in step S2518), the processing proceeds to step S2520. If the flag is not set (NO in step S2518), the processing proceeds to step S2519.

In step S2520, in the records in the record level, the print setting UI unit 202 writes pages that have the metadata specified in step S2517 in the print target record 206 as target pages for the subset printing. In such a case, both of the record numbers and page numbers are written in the print target record 206.

As described above, by performing the above-described processing, even if a conflict occurs not only in the metadata of the record level, but also in the metadata in the child element of the record level, the subset printing using the metadata can be performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-013241 filed Jan. 25, 2010, which is hereby incorporated by reference herein in its entirety.

What is claimed is:

1. An information processing apparatus comprising:
   a specification unit configured to specify record level from a hierarchical structure of page description language (PDL) data, wherein nodes in layers of the hierarchical structure have metadata, and wherein the record level is a layer level for performing iterative processing in variable printing;
   a display control unit configured to display, as options, a first metadata group and a second metadata group which are contained in a layer of the layer level specified by the specification unit;
   a receiving unit configured to receive, based on a user's input, selection of first metadata selected from the first metadata group and second metadata selected from the second metadata group which are displayed by the display control unit; and
   a determination unit configured to determine a record in which the first metadata and the second metadata received by the receiving unit are set to be as a print target.

2. The information processing apparatus according to claim 1, wherein the display control unit displays the number of records determined to be the print target by the determination unit.

3. The information processing apparatus according to claim 1, wherein the display control unit further displays metadata of a layer upper than the record level specified by the specification unit.

4. A control method comprising:
   specifying a record level from a hierarchical structure of PDL data, wherein nodes in layers of the hierarchical structure have metadata, and wherein the record level is a layer level for performing iterative processing in variable printing;
   displaying, as options, a first metadata group and a second metadata group which are contained in a layer of the specified layer level;

receiving, based on a user's input selection of the first metadata selected from the first metadata group and second metadata selected from the second metadata displayed; and determining a record in which the received first metadata and the second metadata are set to be as a print target.

5. The control method according to claim 4, further comprising displaying the number of records determined to be the print target.

6. The control method according to claim 4, further comprising displaying metadata of a layer upper than the record level specified layer.

7. A non-transitory computer-readable storage medium storing a program for instructing a computer to execute a method, the method comprising:

specifying a record level from a hierarchical structure of PDL data, wherein nodes in layers of the hierarchical structure have metadata, and wherein the record level is a layer level for performing iterative processing in variable printing;

displaying, as options, a first metadata group and a second metadata group which are contained in a layer of the specified layer level;

receiving, based on a user's input selection of the first metadata selected from the first metadata group and second metadata selected from the second metadata displayed; and determining a record in which the received first metadata and the second metadata are set to be as a print target.

8. The storage medium according to claim 7, the method further comprising displaying the number of records determined to be the print target.

9. The storage medium according to claim 7, the method further comprising displaying metadata of a layer upper than the record level specified layer.

* * * * *